US011824887B1

(12) United States Patent
Makohon et al.

(10) Patent No.: US 11,824,887 B1
(45) Date of Patent: **\*Nov. 21, 2023**

(54) ELIMINATING NETWORK SECURITY BLIND SPOTS

(71) Applicant: Wells Fargo Bank, N.A., San Francisco, CA (US)

(72) Inventors: Peter A. Makohon, Huntersville, NC (US); Robert I. Kirby, Charlotte, NC (US); Jonathan A. McNeill, Fleetwood, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/351,905

(22) Filed: Jun. 18, 2021

Related U.S. Application Data

(63) Continuation of application No. 16/111,877, filed on Aug. 24, 2018, now Pat. No. 11,070,581.

(60) Provisional application No. 62/549,736, filed on Aug. 24, 2017.

(51) Int. Cl.
*H04L 9/40* (2022.01)
*H04L 41/14* (2022.01)
*H04L 41/28* (2022.01)

(52) U.S. Cl.
CPC .......... *H04L 63/1433* (2013.01); *H04L 41/14* (2013.01); *H04L 41/28* (2013.01); *H04L 63/1441* (2013.01); *H04L 63/20* (2013.01)

(58) Field of Classification Search
CPC ..... H04L 63/1433; H04L 41/14; H04L 41/28; H04L 63/1441; H04L 63/20
See application file for complete search history.

(56) References Cited

U.S. PATENT DOCUMENTS

| 6,466,898 | B1 * | 10/2002 | Chan | G06F 30/33 |
| | | | | 716/108 |
| 7,506,047 | B2 * | 3/2009 | Wiles, Jr. | H04L 67/02 |
| | | | | 709/224 |
| 8,326,971 | B2 * | 12/2012 | Dickerson | G06F 11/3495 |
| | | | | 714/39 |
| 8,584,226 | B2 * | 11/2013 | Kudla | H04L 63/101 |
| | | | | 726/13 |
| 8,650,292 | B2 * | 2/2014 | Ruiz | H04L 43/55 |
| | | | | 709/224 |

(Continued)

FOREIGN PATENT DOCUMENTS

| CN | 102546624 | 7/2012 |
| WO | 2016043739 | 3/2016 |

*Primary Examiner* — J. Brant Murphy
(74) *Attorney, Agent, or Firm* — Kilpatrick Townsend & Stockton LLP

(57) ABSTRACT

Blind spots in a network system are identified and eliminated. Synthetic transactions are generated and transmitted across a network system, and at least a portion of the synthetic transactions is captured. Parts of the synthetic transactions that were not captured can be determined and employed to generate a logical security map of the network system based on the captured synthetic transactions. At least one blind spot can be identified from in the logical security map of the network system, and a solution determined to eliminate the at least one blind spot. Subsequently, the solution is implemented for the network system to eliminate the blind spot.

17 Claims, 7 Drawing Sheets

(56) References Cited

U.S. PATENT DOCUMENTS

| | | | | |
|---|---|---|---|---|
| 8,887,285 B2* | 11/2014 | Jordan | | H04L 63/1425 |
| | | | | 713/188 |
| 9,294,492 B1* | 3/2016 | Martini | | H04L 63/0876 |
| 9,329,973 B2* | 5/2016 | Bhuyan | | G06F 21/53 |
| 9,386,034 B2* | 7/2016 | Cochenour | | H04L 63/1425 |
| 9,390,268 B1* | 7/2016 | Martini | | H04L 63/1433 |
| 9,461,968 B2* | 10/2016 | Chang | | H04L 67/303 |
| 9,483,742 B1* | 11/2016 | Ahmed | | H04L 63/1441 |
| 9,497,204 B2* | 11/2016 | Symons | | H04L 63/1441 |
| 10,270,808 B1* | 4/2019 | Sherif | | G06Q 50/265 |
| 11,341,267 B1* | 5/2022 | Haverlah | | H04L 9/0637 |
| 2002/0123875 A1* | 9/2002 | Roesner | | G06F 30/33 |
| | | | | 703/17 |
| 2003/0055883 A1* | 3/2003 | Wiles, Jr. | | H04L 43/00 |
| | | | | 709/217 |
| 2007/0192860 A1* | 8/2007 | Hiscock | | G06F 21/55 |
| | | | | 726/23 |
| 2007/0300296 A1* | 12/2007 | Kudla | | H04L 63/0263 |
| | | | | 726/13 |
| 2008/0229149 A1* | 9/2008 | Penton | | G06F 21/577 |
| | | | | 714/30 |
| 2009/0144409 A1* | 6/2009 | Dickerson | | G06F 11/3495 |
| | | | | 709/224 |
| 2009/0186610 A1* | 7/2009 | Avni | | H04W 24/08 |
| | | | | 455/425 |
| 2010/0161875 A1* | 6/2010 | Chang | | G06F 9/4552 |
| | | | | 718/1 |
| 2012/0016983 A1* | 1/2012 | Ruiz | | H04L 43/55 |
| | | | | 709/224 |
| 2013/0173585 A1* | 7/2013 | Friedlander | | G06F 16/90335 |
| | | | | 707/E17.131 |
| 2014/0359642 A1* | 12/2014 | Need | | G06F 9/54 |
| | | | | 719/318 |
| 2015/0163200 A1* | 6/2015 | Chang | | H04L 63/0227 |
| | | | | 726/1 |
| 2015/0172300 A1* | 6/2015 | Cochenour | | G06F 21/6218 |
| | | | | 726/23 |
| 2016/0028854 A1* | 1/2016 | Leeb | | H04W 24/06 |
| | | | | 709/203 |
| 2016/0124954 A1* | 5/2016 | Bishop | | G06F 16/288 |
| | | | | 707/723 |
| 2016/0124961 A1* | 5/2016 | Bishop | | G06F 16/24522 |
| | | | | 707/749 |
| 2017/0083816 A1* | 3/2017 | Friedlander | | G06N 5/022 |
| 2017/0091639 A1* | 3/2017 | Adams | | G16H 50/70 |
| 2019/0164173 A1* | 5/2019 | Liu | | G06Q 30/0185 |

* cited by examiner

ELIMINATING NETWORK SECURITY BLIND SPOTS

CROSS-REFERENCE TO RELATED APPLICATIONS

This application is a continuation of U.S. patent application Ser. No. 16/111,877, filed Aug. 24, 2018, and entitled "ELIMINATING NETWORK SECURITY BLINK SPOTS," which claims the benefit of U.S. Provisional Patent Application No. 62/549,736, filed Aug. 24, 2017, and entitled "ELIMINATING NETWORK SECURITY BLIND SPOTS." The entireties of these applications are incorporated herein by reference.

BACKGROUND

Network security is increasingly important. Security assets are deployed on network systems to ensure malicious software, data packets, or traffic are detected for the network system before causing network interruptions or compromising important data. However, oftentimes, the security assets fail to protect the entirety of the network system. The security assets may not protect unpredictable blind spots in the network system that can lead to the susceptibilities in the network system that can be compromised. Further, it is difficult and dangerous to troubleshoot and detect blind spots through conventional real network traffic.

BRIEF SUMMARY OF THE DESCRIPTION

The following presents a simplified summary of aspects of this disclosure to provide a basic understanding of some aspects of the innovation. This summary is not an extensive overview of the innovation. It is not intended to identify key/critical elements of the innovation or to delineate the scope of innovation. Its sole purpose is to present some concepts of the innovation in a simplified form as a prelude to the more detailed description that is presented later.

The innovation, as disclosed and claimed herein, in one aspect thereof, comprises systems and methods for eliminating network security blind spots. In one instance, a system is disclosed that comprises a hardware processor coupled to a memory that stores instructions that, when executed by the processor to generate a synthetic transaction that replicates an expected transaction on a network system for testing, initiate transmission of the synthetic transaction across the network system, and determine a blind spot in the network system where the synthetic transaction was sent and undetected. In one instance, the synthetic transaction can be designed so that it cannot damage the network system. The instructions further cause the processor to generate a logical security map of the network system based on captured synthetic transactions. The processor can subsequently identify the synthetic transaction as undetected based on analysis of the logical security map of the network system such that a synthetic transaction is deemed undetected when it is not captured by the logical security map. The analysis can also compare an expected logical security map to the logical security map to determine if the synthetic transaction is undetected. The instructions can further cause the processor to determine a solution to eliminate the blind spot. In one instance, the processor can initiate reconfiguration of a security asset to eliminate the blind spot. In another instance, the processor can initiate acquisition of a security asset to eliminate the blind spot. Further, the instructions can cause the processor to identify the blind spot on a heat map.

A method is also disclosed that comprises generating a synthetic transaction that replicates an expected transaction on a network system for testing, initiating transmission of the synthetic transaction across the network system, and determining a blind spot in the network system where the synthetic transaction was sent and undetected. The method further comprises identifying the synthetic transaction as undetected based on analysis of a logical security map of the network system. The method includes comparing an expected logical security map to the logical security map to identify an undetected transaction in one scenario. The method further comprising identifying an undetected synthetic transaction when the synthetic transaction is present in the expected logical security map and absent from the logical security map. The method further comprises identifying a solution that eliminates the blind spot by initiating configuration of a security asset to eliminate the blind spot or initiating acquisition of a security asset that eliminates the blind spot.

Also disclosed is a computer-readable storage medium having instructions stored thereon that enable at least one processor to perform operations upon execution of the instructions. The operations comprise generating a synthetic transaction that replicates an expected transaction on a network system for testing, wherein the synthetic transaction is unable to harm the network system, initiating transmission of the synthetic transaction across the network system, and determining a blind spot in the network system where the synthetic transaction was sent and undetected. Further, the operations can comprise deeming the synthetic transaction undetected based on analysis of a logical security map of the network system. Further, the operations comprise identifying a solution that eliminates the blind spot.

In aspects, the subject innovation provides substantial benefits in terms of network diagnostics and security. One advantage resides in a better understanding of the deficiencies of network security assets. Another advantage resides in testing the network security with network traffic that is known and unable to cause damage to the network system.

To the accomplishment of the foregoing and related ends, certain illustrative aspects of the innovation are described herein in connection with the following description and the annexed drawings. These aspects are indicative, however, of but a few of the various ways in which the principles of the innovation can be employed, and the subject innovation is intended to include all such aspects and their equivalents. Other advantages and novel features of the innovation will become apparent from the following detailed description when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
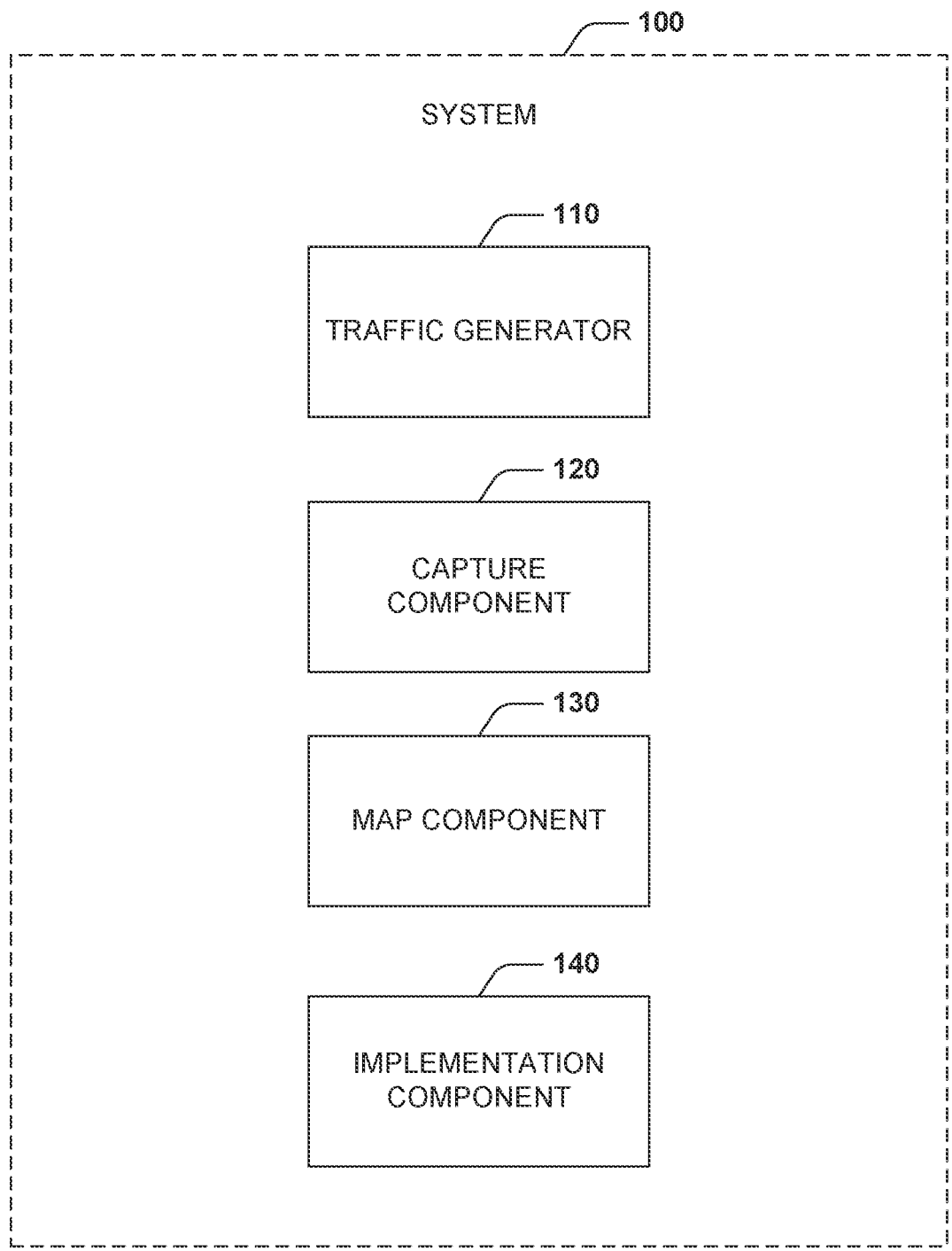
FIG. 1 illustrates an example component diagram of a system for determining network system blind spots.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components may reside within a process or thread of execution, and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for determining network system blind spots in security assets/protocols implemented on a network system. The system 100 includes a traffic generator 110. The traffic generator 110 can generate synthetic transactions to test the network system. In some embodiments, the synthetic transactions travel across the network system. In some embodiments, the synthetic transactions replicate usual traffic expected for the network system. The synthetic transactions are known by a technician and are designed such that the synthetic transactions cannot damage the network system. The traffic generator 110 can replicate network traffic between nodes on the network system. The traffic generator 110 can generate traffic that can appear to be from outside the network system to specific nodes or parts of the network system.

The network system can be a mobile network, wired LAN, wireless LAN, an internet network, or the like to transmit communications. The network system can be a corporation-wide network that provides online services and/or access to corporate sites and/or information. In some embodiments, the network system is made up of network segments. The network system can be divided into a series of smaller networks (e.g., sub-networks, virtual networks, ad hoc networks, and/or the like) that can provide access to different services, devices, and/or functionality. The network system can control access to various network segments such that only part of the network may be available to certain users, devices, and/or applications.

The system 100 includes a capture component 120. The capture component 120 can capture the generated synthetic transactions at various locations of the network system. The capture component 120 resides on the network system. The capture component 120 can detect the synthetic transactions on the network system. In some embodiments, the capture component 120 is made of security assets residing on the network system. The security assets are hardware or software implementations to detect malicious network traffic. The capture component 120 can use the security assets to detect the synthetic transactions at different parts or nodes on the network system. In some embodiments, the capture component 120 captures part of the synthetic transactions and does not capture other synthetic transactions.

The system 100 includes a map component 130. The map component 130 generates a logical security map of the network system based on the captured synthetic transactions from the capture component 120. The map component 130 determines parts of the network where the synthetic transactions were detected and parts of the network where the synthetic transactions were not detected. The map component 130 can indicate blind spots in the network system where synthetic transactions were not detected where the transactions were sent and therefore expected to be detected.

The system 100 includes an implementation component 140. The implementation component 140 determines a solution to eliminate blind spots in the network system and implements the solution for the network system. In some embodiments, the implementation component 140 can prioritize acquisition of security assets to eliminate a blind spot. In other embodiments, the implementation component 140 can restructure and/or reconfigure existing security assets of the network system to eliminate a blind spot.

Figure 2:
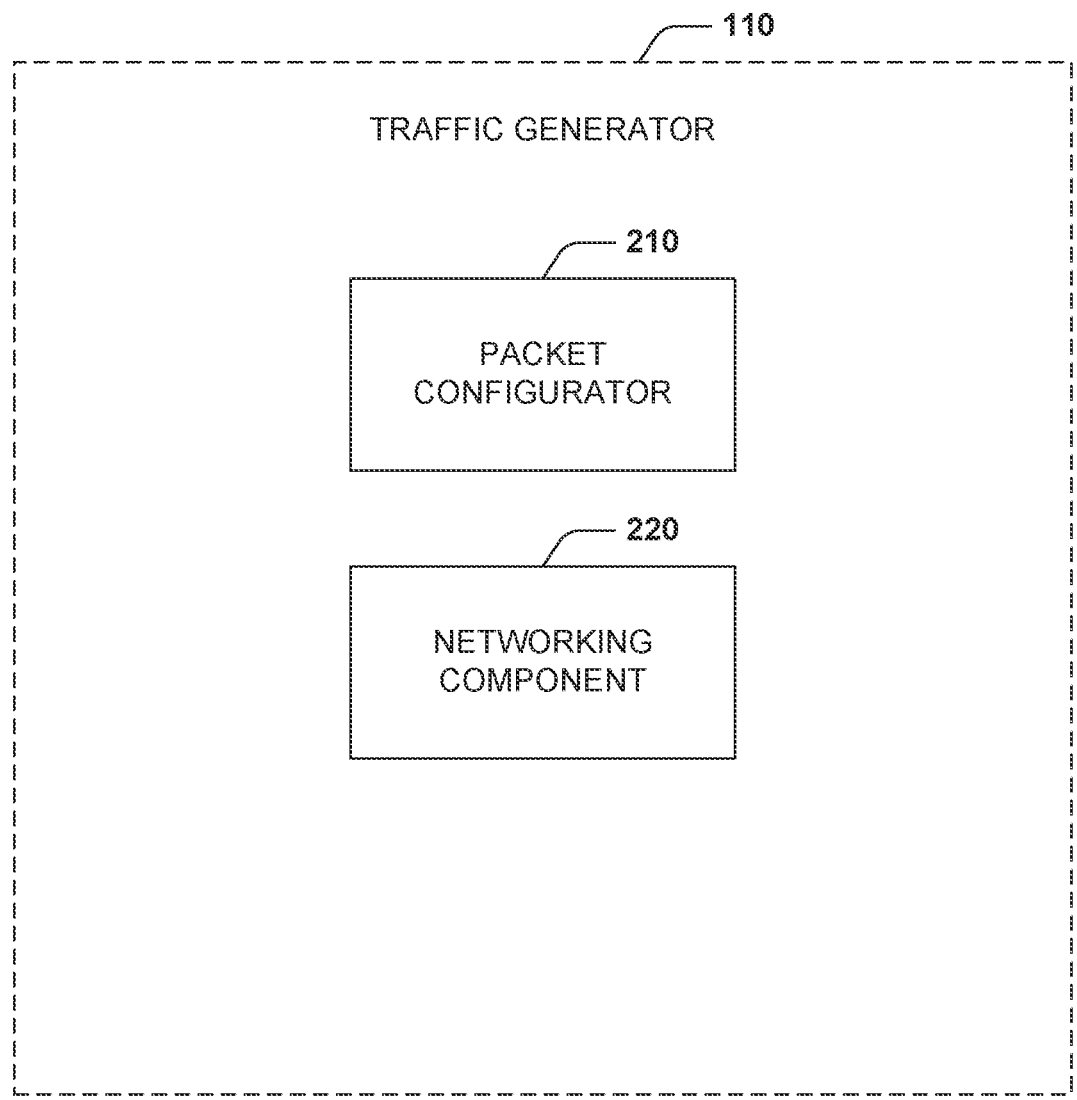
FIG. 2 illustrates an example component diagram of a traffic generator.

FIG. 2 illustrates a detailed component diagram of the traffic generator 110. The traffic generator 110 includes a packet configurator 210. The packet configurator 210 generates data packets between a plurality of nodes residing on the network system that mimic a financial transaction. The packet configurator 210 can design the data packets with benign data. In some embodiments, the data packets include a source address field and a destination address field that are recorded or otherwise known to the network system. The packet configurator 210 can generate a packet to be sent to each node in the network system such that the entire network system may be tested by the capture component 120 and mapped by the map component 130.

The traffic generator 110 includes a networking component 220. The networking component 220 sends the synthetic transactions and/or the data packets through the network system to simulate conventional traffic on the network system. In some embodiments, the networking component 220 can access or reside on a corporation-wide network that provides online services and/or access to corporate sites and/or information.

Figure 3:
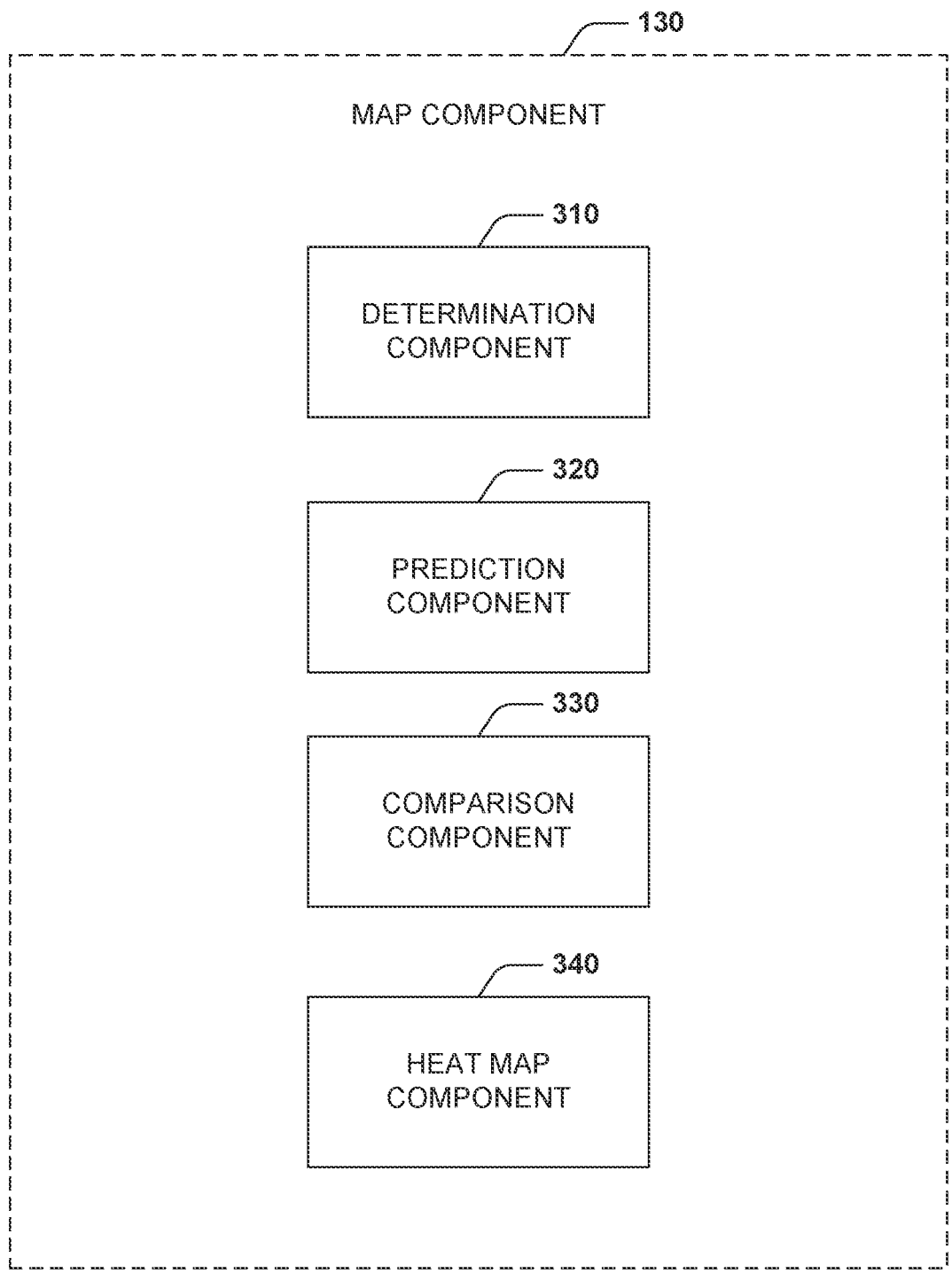
FIG. 3 illustrates an example component diagram of a map component.

FIG. 3 illustrates a component diagram of the map component 130. The map component 130 includes a determination component 310 that determines the synthetic transactions that were not captured. In some embodiments, the determination component 310 can receive the total synthetic transactions sent through the network system from the traffic generator 110. The determination component 310 can receive the captured synthetic transactions from the capture component 120. The determination component 310 evaluates the differences between the total synthetic transactions and the captured transactions. The map component 130 generates a logical security map based on the evaluated differences.

In another embodiment, the map component 130 includes a prediction component 320 that generates an expected security map of the network system. The expected security map can be determined by an evaluation of the security assets to determine expected captured synthetic transactions or traffic. A comparison component 330 compares the expected security map to the generated logical security map to determine blind spots. For example, synthetic transactions directed to Node A of the network system were expected to be captured based on the expected security map. However, it was observed by the capture component 120 that the synthetic transactions were not detected, and therefore the logical security map shows there were no captured synthetic transactions. The comparison component 330 compares the expected security map to the logical security map and determines where expected captures are missing as blind spots.

In some embodiments, the map component 130 may include a heat map component 340 that generates a heat map of the network system based on the captured synthetic transactions. The heat map component 340 can generate a heat map that graphically depicts the severity of blind spots. For example, a node in which a lot of the synthetic transactions passed through uncaptured can be depicted in the heat map as a highlighted or more intensely hued color. In contrast, generally safe nodes where all transactions were captured can be depicted in a more muted color. The heat map provides the system 100, the implementation component 140, and/or a technician with visual feedback to facilitate prioritizing elimination of more critical blind spots over less critical blind spots.

Figure 4:
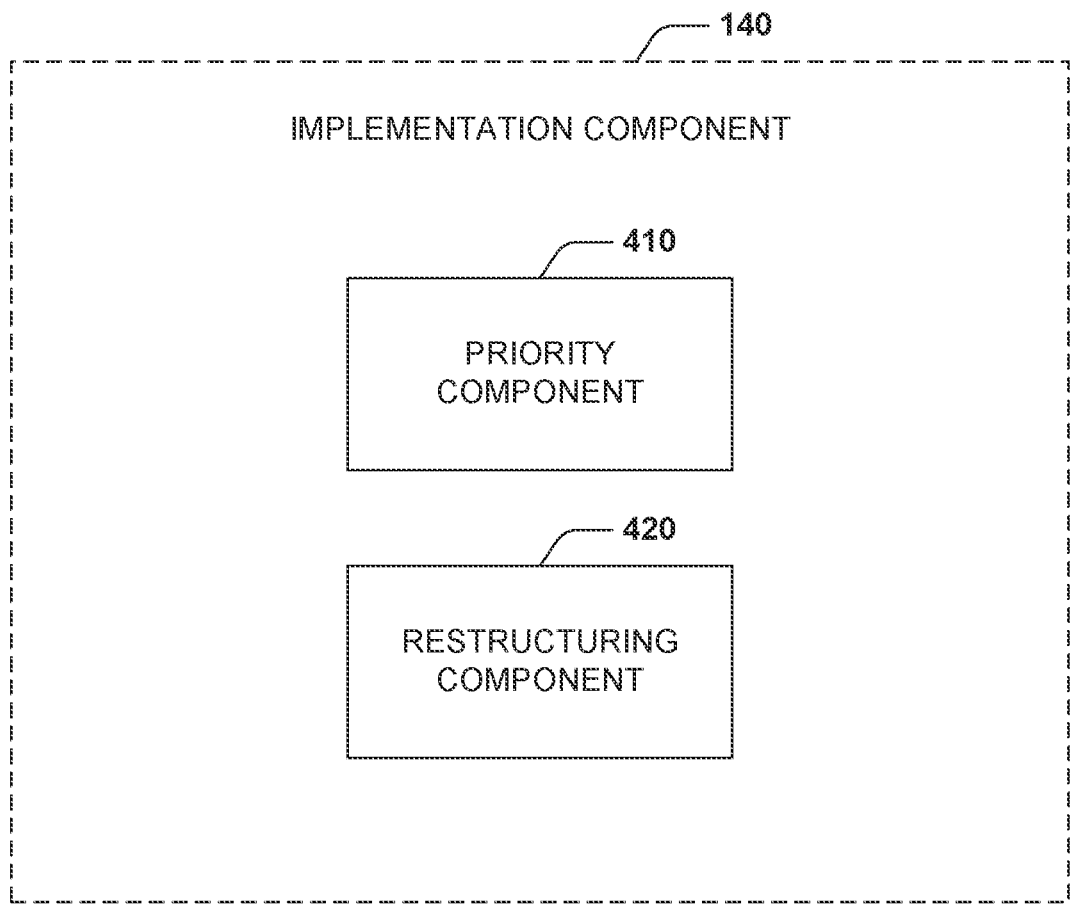
FIG. 4 illustrates an example component diagram of an implementation component.

FIG. 4 illustrates a component diagram of the implementation component 140. The implementation component 140 determines a solution to eliminate the at least one blind spot. The implementation includes a priority component 410. The priority component 410 prioritizes acquisition of at least one security asset to be deployed onto the network system that eliminates the at least one blind spot. In some embodiments, the priority component 410 determines a recommendation to a technician for acquiring additional security assets.

The implementation component 140 can include a restructuring component 420. The restructuring component 420 reconfigures existing security assets that are deployed on the network system. For example, the restructuring component 420 can determine a redundancy of security assets at one part of the network and recommend a redundant security asset to be deployed to a part of the network system having a blind spot. In some embodiments, the restructuring component 420 can determine a new configuration of an existing security asset to eliminate a blind spot. For example, a security asset that is not receiving many synthetic transactions or network traffic may be expanded in scope to include parts of the network system having a blind spot.

Figure 5:
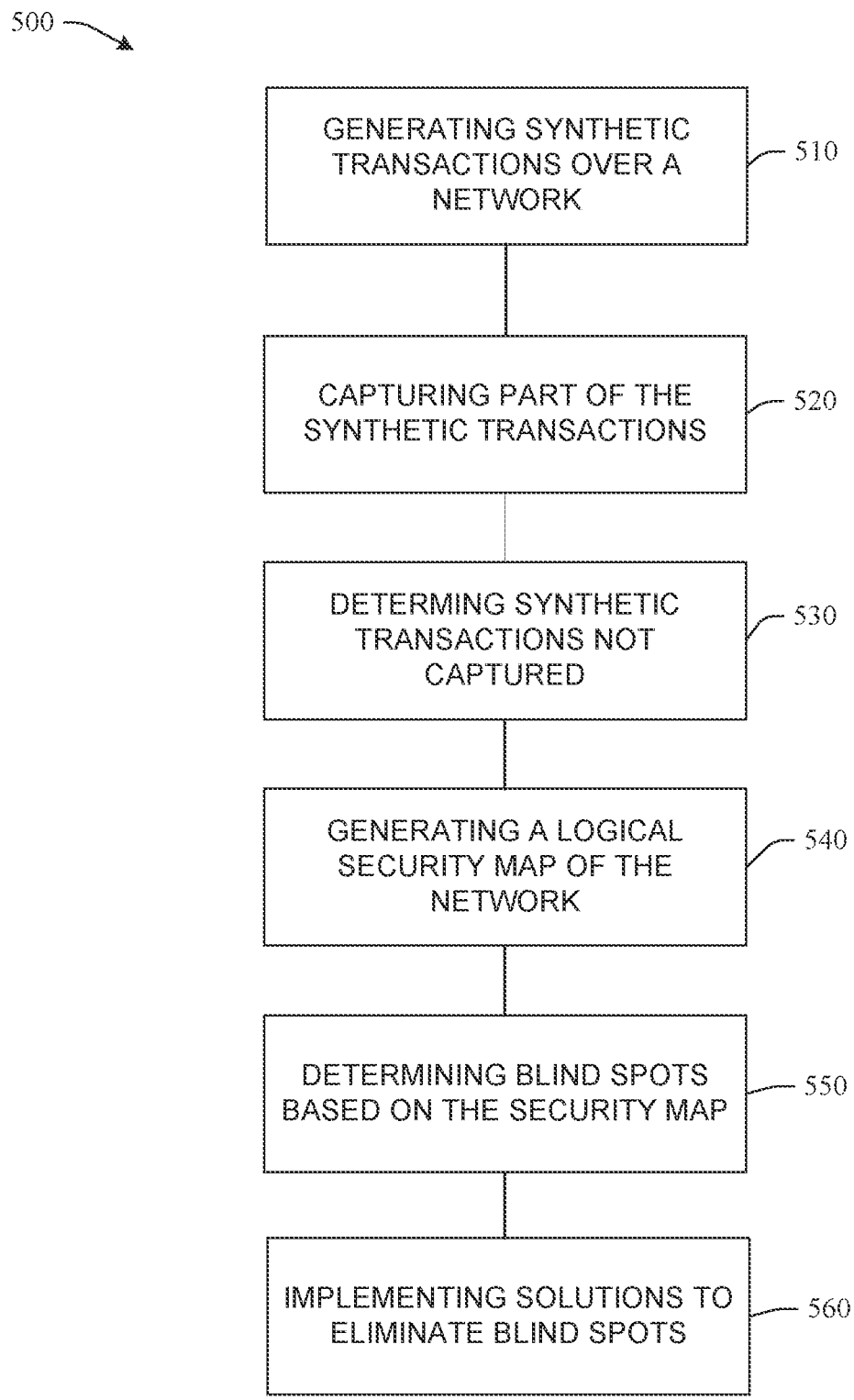
FIG. 5 illustrates a method for determining network blind spots.

With reference to FIG. 5, example methods 500 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 500 is described in conjunction with a specific example is for explanation purposes.

FIG. 5 illustrates a method 500 for determining network system blind spots in security assets/protocols implemented on a network system. At 510, synthetic transactions are generated across a network system. For example, a network system is to be tested for blind spots. Synthetic transactions are generated to be directed across the entire (or substantially the entire) network system for a complete test for blind spots.

At 520, the generated synthetic transactions are captured at the network system level. The synthetic transactions may be captured using hardware security assets, software security tools, and/or a combination of the two. At 530, synthetic transactions that were not captured on the network system are determined. At 540, a logical security map of the network system based on the captured and not captured synthetic transactions is generated. The logical security map can show where the synthetic transactions were and were not captured.

At 550, blind spots in the logical security map of the network system are determined. The blind spots are parts in the network system where synthetic transactions were sent but were not detected during the capture 520. At 560, solutions to eliminate the blind spots in the network system are determined. The solutions can be acquisition of security assets to fill the blind spots or restructuring or reconfiguring of existing security assets.

Figure 6:
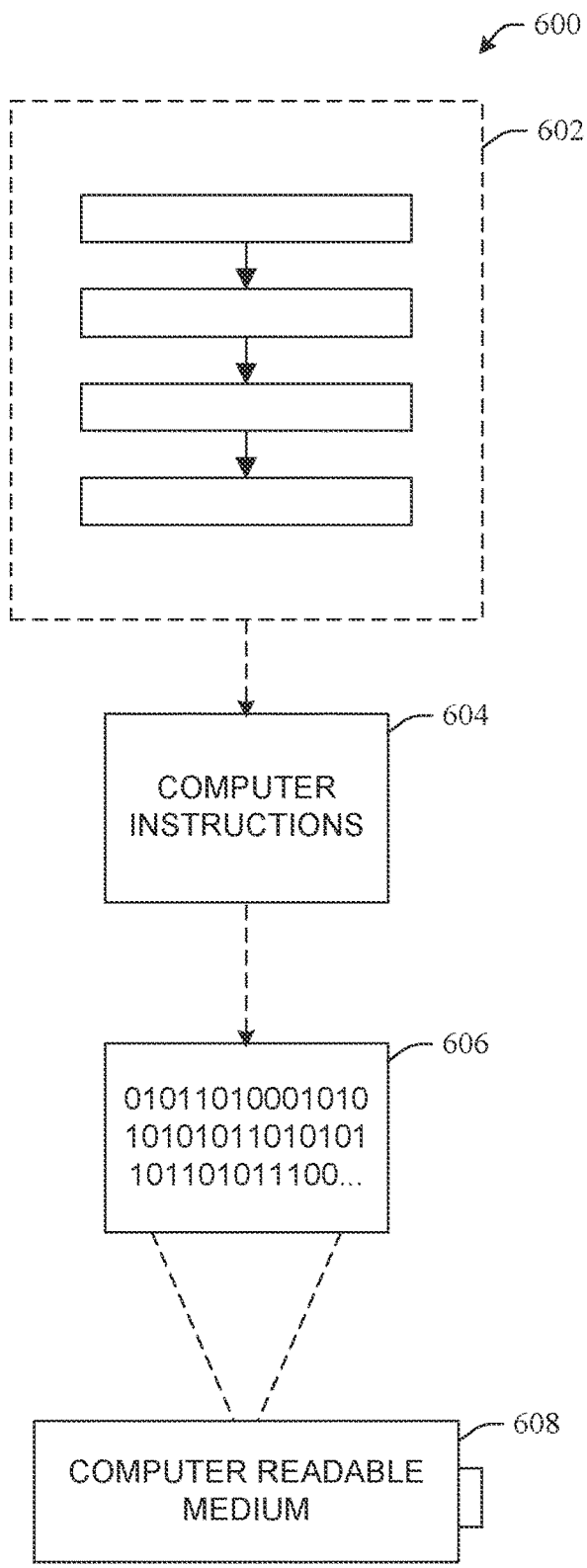
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
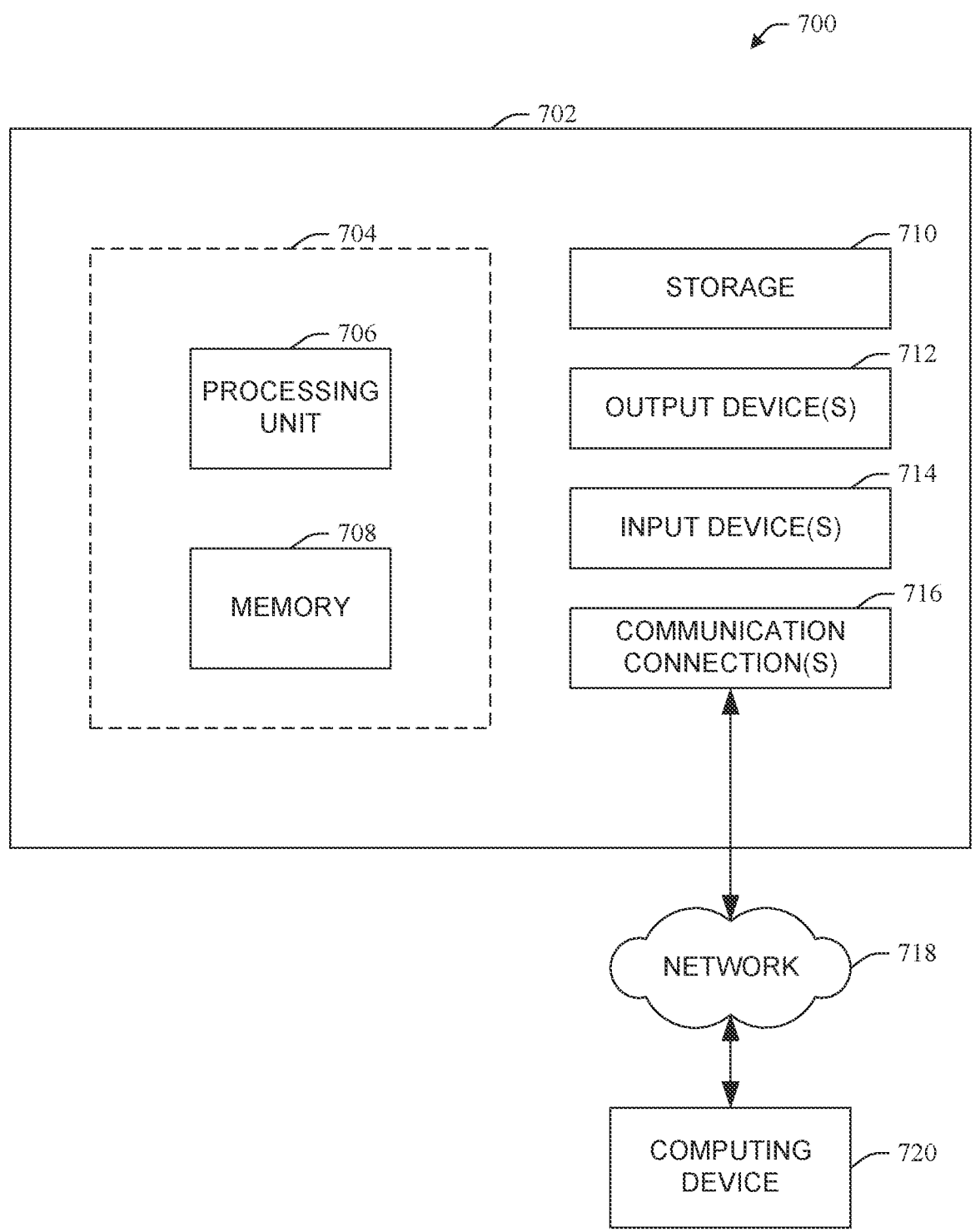
FIG. 7 illustrates a computing environment where one or more of the provisions set forth herein can be implemented, according to some embodiments.

With reference to FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer-readable instructions" being executed by one or more computing devices. Computer-readable instructions are distributed via computer-readable media, as will be discussed below. Computer-readable instructions can be implemented as program modules, such as functions, objects, Application Programming Interfaces (APIs), data structures, and the like, that perform particular tasks or implement particular abstract data types. Typically, the functionality of the computer-readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer-readable instructions to implement one or more embodiments provided herein are in storage 710. Storage 710 can also store other computer-readable instructions to implement an operating system, an application program, and the like. Computer-readable instructions can be accessed in memory 708 for execution by processing unit 706, for example.

The term "computer-readable media" as used herein includes computer storage media. Computer storage media includes volatile and non-volatile, non-transitory, removable and non-removable media implemented in any method or technology for storage of information such as computer-readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer-readable media" includes communication media. Communication media typically embodies computer-readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712, such as one or more displays, speakers, printers, or any other output device, can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation. Still, one of ordinary skill in the art may recognize that many further combinations and permutations of the innovation are possible. Accordingly, the innovation is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a hardware processor coupled to a memory that stores instructions that, when executed by the processor, cause the processor to:
   generate a plurality of synthetic transaction that replicate expected transactions on a network system for testing;
   initiate transmission of the synthetic transactions across the network system;
   generate a first logical security map of the network system indicating locations of detected synthetic transactions and a second logical security map of the network system indicating locations of expected transactions; and
   determine a blind spot in the network system where the synthetic transactions were sent and undetected based on a comparison of the first logical security map and the second logical security map.

2. The system of claim 1, wherein the synthetic transaction is unable to damage the network system.

3. The system of claim 1, wherein the instructions cause the processor to generate the first logical security map of the network system based on captured synthetic transactions.

4. The system of claim 3, wherein the synthetic transaction is undetected when the synthetic transaction is not captured by the first logical security map.

5. The system of claim 1, wherein the instructions further cause the processor to determine a solution to eliminate the blind spot.

6. The system of claim 5, wherein the instructions further cause the processor to initiate reconfiguration of a security asset to eliminate the blind spot.

7. The system of claim 5, wherein the instructions further cause the processor to initiate acquisition of a security asset to eliminate the blind spot.

8. The system of claim 1, wherein the instructions further cause the processor to identify the blind spot on a heat map.

9. A method, comprising:
- generating a plurality of synthetic transactions that replicate expected transactions on a network system for testing;
- initiating transmission of the synthetic transactions across the network system;
- generating a first logical security map of the network system indicating locations of detected synthetic transactions and a second logical security map of the network system indicating locations of expected transactions; and
- determining a blind spot in the network system where the synthetic transactions were sent and undetected based on a comparison of the first logical security map and the second logical security map.

10. The method of claim 9, further comprising identifying the synthetic transaction as undetected based on analysis of the first logical security map of the network system.

11. The method of claim 9, wherein the comparison of the first logical security map and the second logical security map indicates an undetected synthetic transaction when the synthetic transaction is present in the second logical security map and absent from the first logical security map.

12. The method of claim 9, further comprising identifying a solution that eliminates the blind spot.

13. The method of claim 12, further comprising initiating configuration of a security asset to eliminate the blind spot.

14. The method of claim 12 further comprising initiating acquisition of a security asset that eliminates the blind spot.

15. A non-transitory computer-readable storage medium having instructions stored thereon that enable at least one processor to perform operations upon execution of the instructions, the operations, comprising:
- generating a plurality of synthetic transactions that replicate expected transactions on a network system for testing, wherein the synthetic transactions are unable to harm the network system;
- initiating transmission of the synthetic transactions across the network system;
- generating a first logical security map of the network system indicating locations of detected synthetic transactions and a second logical security map of the network system indicating locations of expected transactions; and
- determining a blind spot in the network system where the synthetic transaction was sent and undetected based on a comparison of the first logical security map and the second logical security map.

16. The non-transitory computer-readable storage medium of claim 15, wherein the operations further comprise deeming the synthetic transaction undetected based on analysis of a logical security map of the network system.

17. The non-transitory computer-readable medium of claim 15, wherein the operations further comprise identifying a solution that eliminates the blind spot.

\* \* \* \* \*